Patented Oct. 4, 1927.

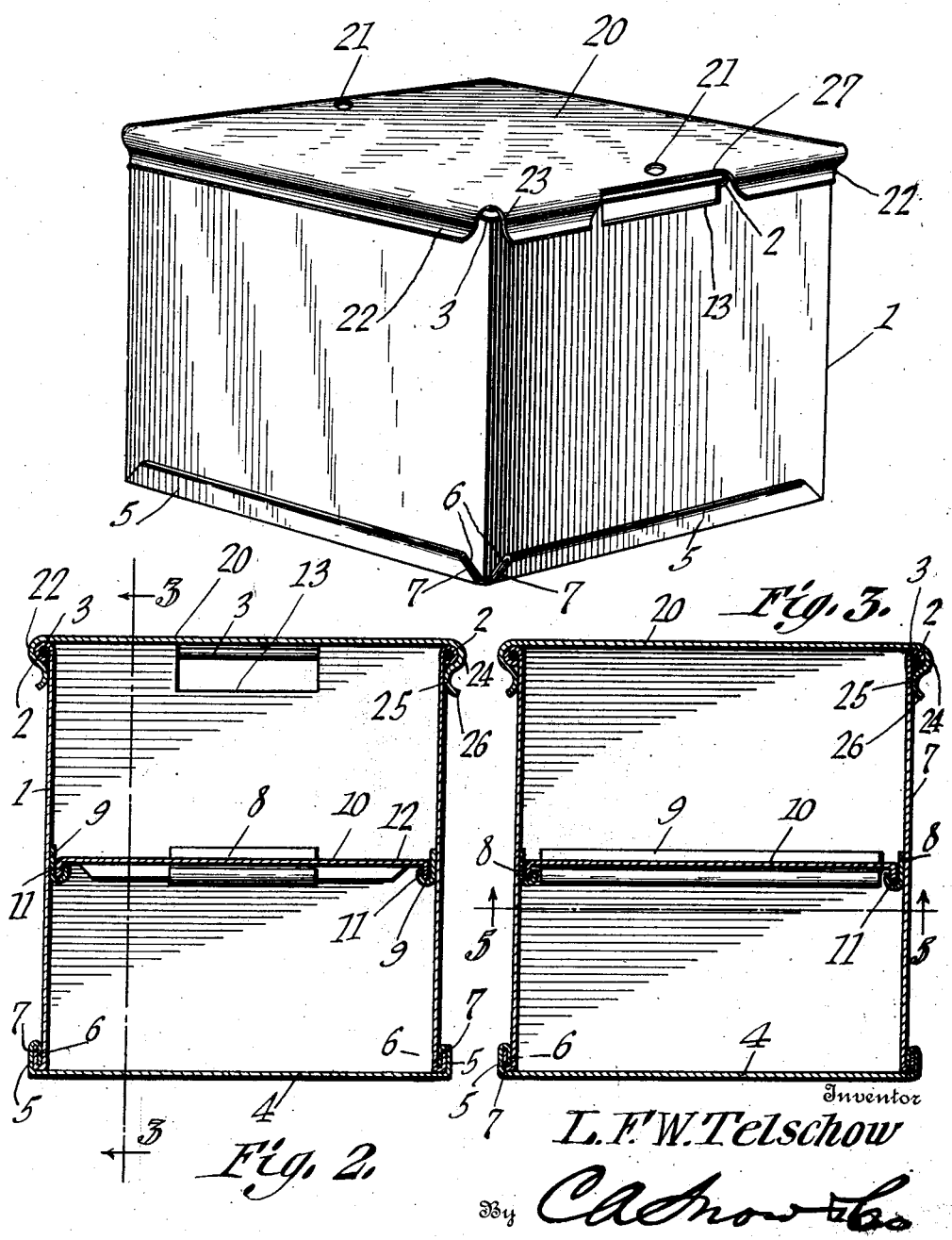

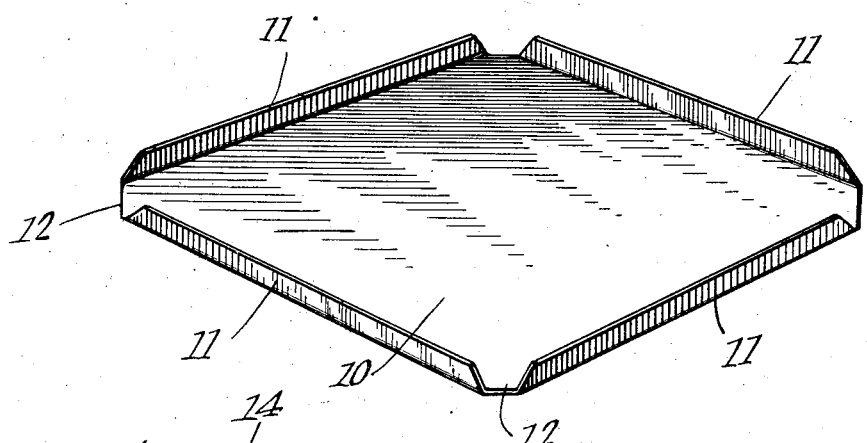
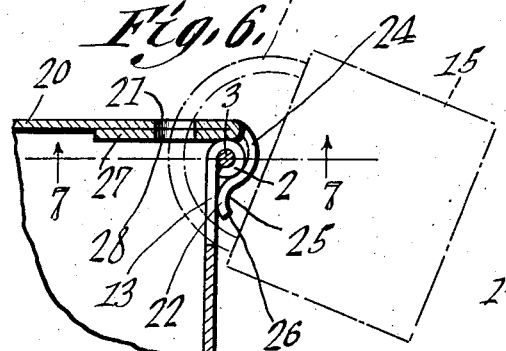
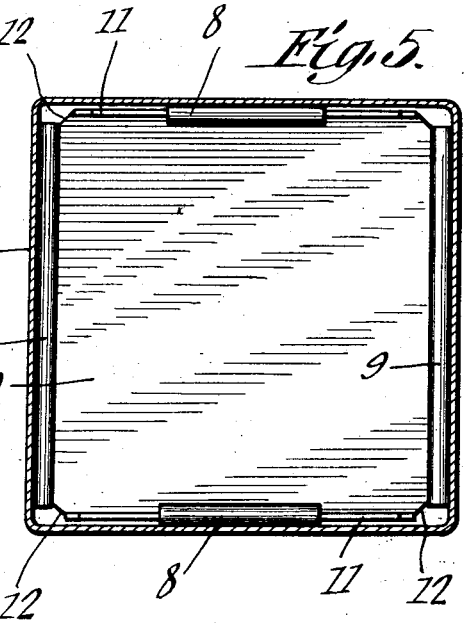
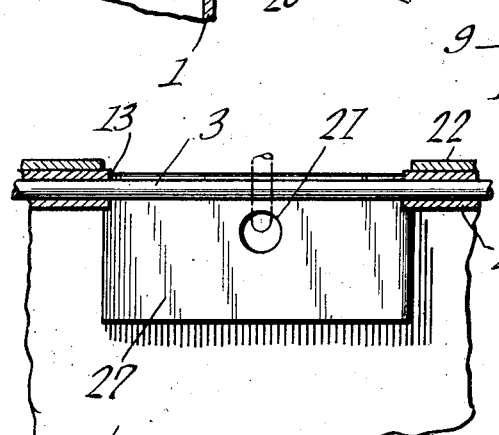

1,644,001

UNITED STATES PATENT OFFICE.

LEWIS F. W. TELSCHOW, OF BUTLER, INDIANA.

BREAD CONTAINER.

Application filed August 25, 1924. Serial No. 734,109.

This invention relates to a shipping crate for bread and the object thereof is to provide a sheet metal container so sonstructed as to preserve the bread sweet and fresh and keep it from crushing while in transit.

Another object is to provide a container of this character which is cheap to construct and easily kept clean, the top of which is self locking.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of the crate construction in accordance with this invention;

Fig. 2 is a transverse section thereof;

Fig. 3 is a similar view taken on the line 3—3 of Fig. 2;

Fig. 4 is a perspective view of the removable horizontal partition;

Fig. 5 is a horizontal section taken on the line 5—5 of Fig. 3 looking in the direction of the arrow;

Fig. 6 is a detail sectional view showing the means for locking the top of the container in closed position; and Fig. 7 is a horizontal section taken on the line 7—7 of Fig. 6.

The container or crate constituting this invention may be of any suitable or desired size and is preferably constructed to hold forty loaves of bread of a pound and a half each which is the standard size and said container is made approximately twenty by twenty by twenty inches from twenty-four or twenty-six gauge galvanized iron sheeting.

This container comprises a body 1 which is substantially rectangular in form, the upper edge of which is rolled outwardly to form a bead 2 in which is mounted a reinforcing wire 3, the corners of the box being preferably cut away and exposing the bead as is shown clearly in Fig. 1.

The bottom 4 of this container has an upstanding flange 5 around its edge the edge of said flange being folded inwardly as shown at 6 to stiffen and reinforce the bottom at this point. The lower edge of the container has an outwardly and upwardly extending flange 7 lying close to the outer face of the side walls thereof and with which the flange 6 of the bottom 4 is designed to interlockingly engage as is shown clearly in Figs. 2 and 3.

The body of the container has its side walls provided on their inner faces at points about midway the height thereof with trough-shaped shelf supports 8 and 9 those 8 on diametrically opposite sides being shorter than those 9 on the other sides.

A removable horizontal partition or shelf 10 is supported by the members 8 and 9, said shelf being provided around its edge with a substantially right-angular down-turned flange 11 cut away at the corners of this shelf as shown at 12, the body of the shelf being also cut away at these corners. These cut away corners of the partition 10 provide for ventilation of the bread in the compartment below the shelf.

The container 1 has two of its side walls cut out at their upper edges as shown at 13 to provide ventilation to the bread and also to permit the insertion of the hasp 14 of a padlock 15, which passes through an aperture 21 in the top or lid 20 and around the wire 3 which is exposed at these points by means of which the lid 20 is held secured to the container as is shown clearly in Fig. 6. It is of course understood that two padlocks 15 are employed one at one side of the container and one at the other since the apertures 21 are duplicated at these points for this purpose.

The lid or top 20 has a flange 22 around the perimeter thereof and cut out at the corners as shown at 23.

The flange 22 curves outwardly as shown at 24 then inwardly as shown at 25 with its edge turned out as shown at 26 to adapt it to shut down over the reinforcing bead 2 and form locking means for the lid to hold it against accidental dislodgment. This lid 20 is provided at diametrically opposite points on two of its side edges with cut out portions in the flanges thereof which portions 27 are spaced inwardly and folded flat against the inner face of the lid as shown clearly in Figs. 6 and 7 which form reinforces for the lid at these points, said inturned portions being apertured as shown at 28 and the apertures registering with the apertures 21 in the lid to adapt the lid to withstand the strain of the padlocks.

In the use of this shipping crate or container, 20 loaves of bread of one pound and a half each will fit in the compartment below the horizontal partition or shelf 10 and after said shelf has been inserted into place 20 more loaves may be arranged above the shelf between it and the lid 20. This number of loaves is held snugly within the container against crushing or shaking and owing to the ventilation produced by the cut corners of the partition 10 and the cut out portions in the flanges of the lid and the side walls of the container the bread will be kept clean and fresh for some time. The locking of the lid to the container by the pad-lock 15 obviously prevents unauthorized persons from having access thereto.

While this container is primarily designed for use in shipping bread obviously it may be used for shipping or storing other articles.

I claim:

In a container, a rectangular body portion formed of sheet metal, a reinforcing wire surrounding the upper extremity of the body portion and around which the upper end of the body portion is bent, said body portion having cut away portions formed adjacent to the wire, exposing portions of the wire, a removable top having depending outwardly curved flanges split at their corners to lend resiliency to the flanges, said flanges adapted to fit over the wire and frictionally engage the wire to hold the removable top in position, said removable top having openings adjacent to the wire to receive padlocks passed through the cut out portions of the body, and a bottom for the body portion.

In testimony that I claim the foregoing as my own, I have hereto affixed my signature.

LEWIS F. W. TELSCHOW.